United States Patent
Lopriore

(10) Patent No.: US 7,890,225 B2
(45) Date of Patent: Feb. 15, 2011

(54) AUTOMATIC PILOT MODULE AND SYSTEM FOR AUTOMATICALLY STEERING A SAILBOAT FOR SAILING IN THE PRESENCE OF WAVES

(75) Inventor: Mario Lopriore, Oegstgeest (NL)

(73) Assignee: Agence Spatiale Europeenne, Paris Cedex (FR)

( * ) Notice: Subject to any disclaimer, the term of this patent is extended or adjusted under 35 U.S.C. 154(b) by 7 days.

(21) Appl. No.: 11/921,761

(22) PCT Filed: Jun. 1, 2006

(86) PCT No.: PCT/FR2006/001240

§ 371 (c)(1),
(2), (4) Date: Apr. 1, 2009

(87) PCT Pub. No.: WO2006/131622

PCT Pub. Date: Dec. 14, 2006

(65) Prior Publication Data

US 2009/0222154 A1   Sep. 3, 2009

(30) Foreign Application Priority Data

Jun. 10, 2005   (FR) ................... 05 05912

(51) Int. Cl.
*B60L 3/00* (2006.01)

(52) U.S. Cl. ................. 701/21; 701/36; 701/41; 114/144 A

(58) Field of Classification Search ........... 701/21, 701/33, 36, 41, 79, 213; 114/144 A
See application file for complete search history.

(56) References Cited

U.S. PATENT DOCUMENTS

| | | | | |
|---|---|---|---|---|
| 3,838,656 | A | * | 10/1974 | Greene ............... 114/144 R |
| 4,040,374 | A | * | 8/1977 | Greene ............... 114/144 C |
| 4,597,349 | A | * | 7/1986 | Dolfi ................. 114/144 A |
| 5,152,239 | A | | 10/1992 | Hossfield et al. |
| 5,408,406 | A | | 4/1995 | Mathur et al. |
| 5,632,217 | A | | 5/1997 | Ford et al. |

FOREIGN PATENT DOCUMENTS

| | | |
|---|---|---|
| DE | 199 00 847 | 7/1999 |
| EP | 0 129 287 | 12/1984 |
| EP | 0 710 901 | 5/1996 |
| JP | 59-8593 | 1/1984 |

OTHER PUBLICATIONS

F. Bethwaite, "High Performance Sailing", International Marine/Ragged Mountain Press, 1st Edition (1996), ISBN 0/7136-6704-4, pp. 305-319.
J. Saltonstall, "This is Sailing; Surfing in a Following Sea", ISBN 0713663596, pp. 96-97.
M. Martin Neira, Doctoral Thesis, "Application of GNSS Systems to Spacecraft Landing, Attitude Determination and Earth Observation Constellations", Apr. 5, 1996.

* cited by examiner

*Primary Examiner*—Gertrude Arthur Jeanglaud
(74) *Attorney, Agent, or Firm*—Clark & Brody

(57) ABSTRACT

A steering correction signal generator module (MC) for generating steering correction signals (SC) for an automatic pilot for automatically steering a sailboat comprises: an inlet (EM) for a signal (SM) indicating movement of the sailboat that is caused by waves; a processing unit (UE) for generating a steering correction signal (SC) on the basis of the signal (SM) indicating movement of the sailboat; and an outlet (SSC) for the steering correction signal (SC); in which module the steering correction signal (SC) is determined in a manner such as to cause the course of the sailboat to be corrected towards the direction from which the waves are coming in correspondence with their crests (CI, CII) and away from the direction in correspondence with their troughs (CR). The invention also relates to an automatic pilot system for automatically steering a sailboat, which system includes such a module (MC).

8 Claims, 1 Drawing Sheet

AUTOMATIC PILOT MODULE AND SYSTEM FOR AUTOMATICALLY STEERING A SAILBOAT FOR SAILING IN THE PRESENCE OF WAVES

FIELD OF THE INVENTION

The invention relates to a module for generating correction signals for an automatic pilot system for automatically steering a sailboat, which module enables the automatic pilot system to perform course corrections while taking account of the effect of the waves on the sailing, in particular in order to increase the speed of the sailboat, in order to decrease its drift, and in order to increase comfort on board.

The invention also relates to an automatic pilot system including such a module.

BACKGROUND OF THE INVENTION

It is known that, when sailing in the presence of waves, it is preferable, from the points of view of minimizing drift, of maximizing boat speed, and of increasing on-board comfort, not to keep the rudder in a fixed position, but rather to make rapid course corrections in correspondence with each wave. This is particularly important when the direction of the waves coincides with the wind direction, and the boat is sailing close-hauled or, at the opposite extreme, the boat is sailing on a broad reach.

The effect of waves on sailing a sailboat in the former case (closed-hauled, with the waves coming from the same direction as the wind) is explained in detail in the work by Frank Bethwaite entitled "High Performance Sailing", International Marine/Ragged Mountain Press, $1^{st}$ edition (1996), ISBN 0-7136-6704-4, pages 305-319.

The types of corrections to be made on a broad reach are explained in the work entitled "This is Sailing" by Jim Saltonstall, ISBN-0713663596, pages 96 and 97.

That type of sailing requires a great deal of attention from a very experienced helmsperson, which limits its field of application to competitive sailing. It would be advantageous also to make that type of correction in recreational sailing, mainly with the aim of improving comfort on board. Unfortunately that is not generally possible, either because the helmsperson lacks the necessary experience, or because the effort required of the helmsperson is excessive compared with what is at stake.

Even in competitive sailing, it would be advantageous to lighten the task for the helmsperson both in order to make the helmsperson less tired, and in order to enable him or her to leave the helm momentarily without the quality of sailing being degraded.

Prior art automatic pilot systems for automatically steering sailboats do not offer any solution to that problem. Such systems generally comprise a wind sensor, a steering compass, a pilot module, and a rudder actuator module for actuating the rudder of the boat. The pilot module receives, as input, signals coming from the compass and from the wind sensor, and generates, as output, control signals for controlling the rudder actuator module in a manner such as to hold a determined sailing direction either relative to North or relative to the wind direction. Such known automatic pilot systems thus keep the boat heading in a fixed direction and do not make the above-mentioned course corrections in correspondence with the waves. As a result, sailing on automatic pilot in the presence of waves is not good in terms of comfort or in terms of performance, especially on the closed-hauled and broad-reach points of sailing.

Document U.S. Pat. No. 5,632,217 discloses such a conventional automatic pilot system.

SUMMARY OF THE INVENTION

An object of the present invention is to remedy at least one of the above-mentioned drawbacks.

The invention thus provides a steering correction signal generator module for generating steering correction signals and comprising:

an inlet for a signal indicating movement of the sailboat that is caused by waves;

a processing unit for generating a steering correction signal on the basis of said signal indicating movement of the sailboat; and an outlet for said steering correction signal.

Advantageously, the processing unit is designed to generate, in correspondence with the sailboat going over a wave, a steering correction signal determined on the basis of a portion of said signal indicating movement of the sailboat that is caused by the same wave, so as to make corrections wave-by-wave.

In an embodiment of the invention, such a module further comprises an inlet for a training signal representative of a steering correction made manually by a human operator during a calibration stage, and the processing unit includes training means for determining, on the basis of said training signal, a relationship between said signal indicating movement of the sailboat and the corresponding steering correction signal.

More precisely, at least one parameter from among the amplitude, the length of time, and the timing of said steering correction signal is determined on the basis of a mean value of a parameter of said training signal.

In order to obtain better performance, said relationship between said signal indicating movement of the sailboat and the corresponding steering correction signal may also be determined, at least in part, by a system identification algorithm.

Advantageously, such a module further comprises an inlet for a manual adjustment signal for manually adjusting said steering correction signal.

The invention also provides an automatic pilot system for automatically steering a sailboat, which system comprises:

a main pilot module for generating a main steering signal in order to keep the sailboat on a predetermined heading;

a movement detector device for detecting movement of the sailboat that is caused by waves, and for generating a signal indicating said movement;

a steering correction signal generator unit as described above for receiving as input said signal indicating movement of the sailboat and for generating a steering correction signal; and an actuator module for actuating the rudder of said sailboat on the basis at least of said main steering signal and of said steering correction signal.

In particular, said steering correction signal is determined in a manner such as to cause the course of the sailboat to be corrected towards the direction from which the waves are coming in correspondence with their crests and away from said direction in correspondence with their troughs.

Said movement detector device for detecting movement of the sailboat may include at least one accelerometer for determining acceleration of a portion of the sailboat, and/or at least one satellite positioning device for determining the instantaneous position of a portion of the sailboat.

BRIEF DESCRIPTION OF THE DRAWINGS

Other characteristics, details, and advantages of the invention appear on reading the following description given with reference to the accompanying drawing which is given by way of example and in which.

DETAILED DESCRIPTION OF THE INVENTION

Figure 1:
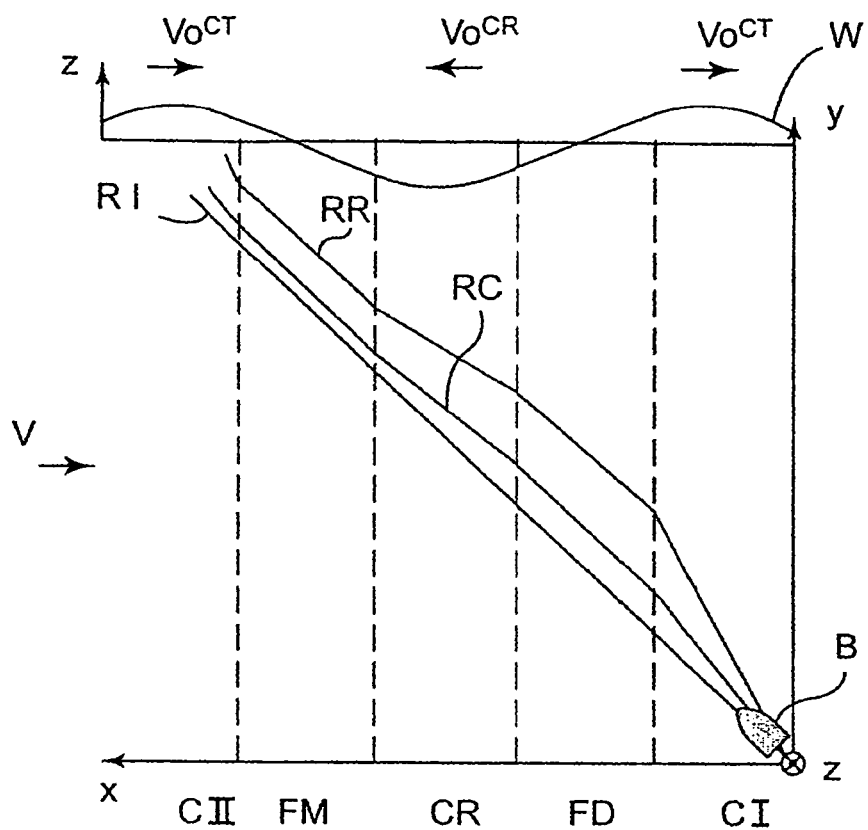
FIG. 1 shows the effect of waves on the course followed by sailboat sailing close-hauled, and the advantages that can be obtained by means of appropriate course corrections.

FIG. 1 diagrammatically shows a portion of a stretch of water x-y in which waves are propagating in the direction V (which corresponds to the direction −x) coinciding with the direction of the true wind; naturally, exact coincidence is not required in practice. A sailboat B wishes to sail "against" both the wind and the waves, by following a course RI that forms an angle of 45° relative to the direction V (close-hauled point of sailing). At the top of the figure, a wave W is shown in section x-z; this wave subdivides the portion of the stretch of water in question into five zones or strips extending along the y-axis; a first crest CI, a falling front FD, a trough CR, a rising front FM, and a second crest CII.

It is known that water molecules in a wave move along paths that are approximately circular. The water thus has a horizontal component of its velocity that, at the crests (CI, CII), is directed in the propagation direction (arrows $V_o^{CT}$ at the top of the figure), and, at the troughs (CR) is directed in the opposite direction (arrow $V_o^{CR}$).

As explained in the above-mentioned work by Frank Bethwaite, when the sailboat B goes over a crest CI or CII, its own movement velocity is combined with the velocity $V_o^{CT}$ of the water: the sailboat is thus slowed down and it drifts to a considerable extent off the "ideal" course RI. Conversely, on going over a crest CR, the sailboat accelerates, and moves back towards said course RI. However, these two effects do not cancel out exactly since, because the sailboat B slows down, it spends a longer time in the crest zones CI, CII than it does in the trough zones CR: therefore, overall, the sailboat B slows down and drifts to a large extent. The line RR represents the course actually followed by a sailboat B that keeps its rudder fixed in the direction indicated by the straight line RI. It should be observed that, in that case, the heading of the sailboat is always parallel to RI but its movement is not.

Appropriate correction can be obtained by luffing up (i.e. bringing the bow towards the direction from which the wind is coming) in correspondence with the crests, and by bearing away (i.e. bringing the bow away from the wind) in correspondence with the troughs. The correction is made in the form of a "pulse" having a length of time of about one second or less, and an amplitude of about 15°; the amplitude and the length of time of the correction, and the exact moment at which it should be applied (timing), depend in complex manner on numerous parameters, such as the speed of the sailboat, its angle of attack at which it attacks the waves, and its hydrodynamic characteristics.

The advantage in terms of performance that is obtained by means of these course corrections can be very considerable. According to Bethwaite, with waves 100 feet (30.48 meters) long and 6 feet (1.83 meters) tall, a sailboat sailing at an average speed of 5 knots (1 knot=1.852 kilometers per hour) without making corrections suffers a loss of velocity made good of 30%, velocity made good (or "closing speed") being defined as the distance traveled in the direction of the "ideal" course RI per unit time. This loss of velocity made good can be reduced to 5% by making the appropriate corrections. In addition, the sailing is made more comfortable because the sailboat goes through the troughs CR of the waves while forming an angle relative to the propagation direction of the waves that is greater than when sailing on a fixed heading: it is thus possible to prevent the bow of the sailboat from colliding violently with the next rising front FM. The line RC shows an example of an actual course obtained by making such corrections.

As explained by the above-mentioned work "This is sailing" by Jim Saltonstall, the same technique can be applied advantageously when sailing on a reach, when the propagation velocity of the waves is greater than the velocity of the sailboat, and forms an angle relative to the heading that is greater than 90° (waves coming from behind). In which case, it is advantageous to bear away as the wave is arriving from behind, so as to take advantage for as long as possible of the effect of the thrust generated by said wave, and to luff up as the sailboat is overtaken by the wave, so as to minimize the length of time of the ensuing slowdown.

Conventionally, these corrections are applied manually by the helmsperson who determines their amplitude, their length of time, and their timing through his or her experience.

Figure 2:
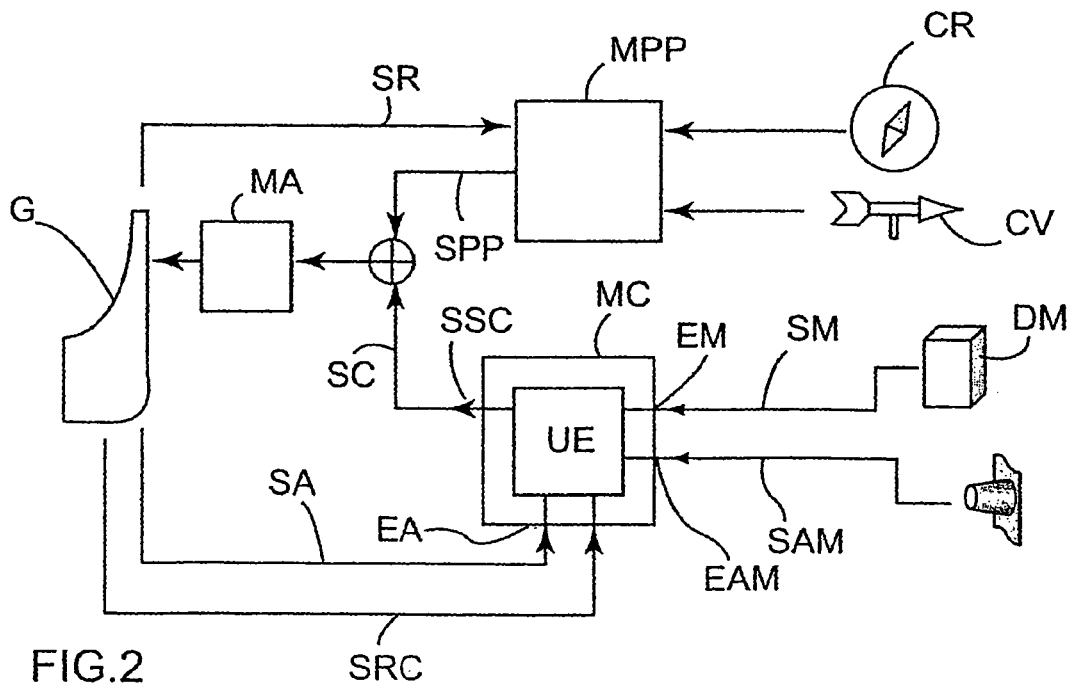
FIG. 2 is a block diagram showing the principle of an embodiment of the invention.

FIG. 2 is a block diagram showing the principle of a system of the invention that makes it possible to apply said corrections while the sailboat is being steered without continuous human intervention being necessary. Such a system comprises the elements of a conventional automatic pilot system: a steering compass CR, a wind sensor CV for detecting at least the direction of the wind, an actuator module MA for actuating a rudder G, and a main pilot module MPP. In known manner, the main pilot module receives as input a signal generated by the compass CR and indicating the angle of the heading relative to North, a signal from the wind sensor CV indicating the direction (and optionally the speed) of the wind, and a feedback signal SR coming from the rudder G and indicating the angular position thereof. On the basis of these input signals, the main pilot module MPP generates a main steering signal SPP that controls the actuator module MA in a manner such that it acts on the ruder so as to keep the sailboat on a fixed heading relative to North or to the direction of the wind.

Unlike a system known from the prior art, the automatic pilot system of the invention further comprises a correction module MC that receives as input EM a signal SM indicating a movement of the sailboat caused by the wave (roll, pitch, and heave). The signal SM is generated by a movement detector device DM that can, for example, be constituted by a three-dimensional set of accelerometers, or else by a satellite positioning system (GPS, EGNOS, or Galileo) that is sensitive to the heave of the sailboat in correspondence with the waves, by a clinometer, or indeed by a combination of these types of detector.

As regards the use of a satellite positioning system, the non-consecutive carrier phase double difference technique makes it possible to measure the period of the waves and their height with an error of about 5 centimeters by means of a single GPS receiver on board a boat. That technique, described in the doctoral thesis by M. Martin Neira entitled "Application of GNSS Systems to Spacecraft Landing, Attitude Determination and Earth Observation Constellations", Apr. 5, 1996 includes determination of the phase difference between the carriers of two satellites at two different instants, namely an initial instant and a present instant.

On the basis of said signal SM, and optionally of a second feedback signal SRC coming from the rudder G, a processing unit UE determines a steering correction signal SC serving to act on the rudder G so as to modify the heading in a manner such as to point the bow of the sailboat towards the direction from which the waves are coming in correspondence with their crests, and away from said direction in correspondence with their troughs, as described above.

The correction signal SC, taken from an outlet SSC of said correction module MC, is combined with the main steering signal SPP in an adder device S so as to generate a steering signal SPC that incorporates said corrections and that is delivered as input to the actuator module MA.

Preferably, the correction applied in correspondence with each wave is determined as a function of the signal SM corresponding to the movement of the sailboat that is caused by the same wave: in other words, the correction module acts as a human helmsperson who "feels" the wave on going over it, and determines the correction on the basis of that feeling. In an alternative embodiment, the correction for each wave is based on the signal SM corresponding to the preceding wave, or on an optionally weighted mean of a certain number of preceding waves. This embodiment requires less strict constraints on the speed of the movement detector device DM and on the processing unit EM, but makes the correction less fine: it is known that the height of the waves is not constant and that one wave in every seven is significantly taller than the others. It is also possible to combine these embodiments and to determine the correction signal SC on the basis of a weighted mean of the signals SM corresponding to the current wave and to the preceding waves.

The correction signal SC cannot always be expressed in the form of a function that is determined once and for all of the signal SM: as explained above, the amplitude and the length of time of the correction, as well as the precise moment at which it should be made depend in complex manner on numerous parameters such as wind speed, height and length of waves, boat speed, angle of attack of waves, and the characteristics of the sailboat; calibration is therefore necessary.

Such calibration can be made by the helmsperson who, for an initial period of time, steers the sailboat himself or herself while making the necessary corrections manually. During this calibration period, the processing unit UE of the correction module MC receives the signal SM representative of the movement of the sailboat, and, at an inlet EA, a training signal SA representative of the corrections made manually (the training signal SA can actually coincide with the second feedback signal SRC coming from the rudder G, although, in the figure, it is shown as a distinct signal). Using training means (generally software means executing a suitable algorithm), the processing unit determines an empirical relationship between SM and the adapted correction signal SC, whereupon the system can operate automatically, at least until a change in sea conditions or in wind conditions makes it necessary for human intervention again.

In the simplest case, the processing unit UE computes an optionally weighted mean of the manually applied corrections. In other words, it determines a mean amplitude, a mean length of time, and a mean timing (defined, for example, as a delay in the computed course correction as from going over the crest, as from going through the trough, or as from the point of maximum acceleration of the wave) for the correction signal SC' that would cause the same effect on the rudder G as the effect caused by the manual corrections made by the helmsperson. This mean correction signal is applied on going over each successive wave, the signal SM being used merely as a timing signal.

Better performance can be obtained, subject to providing greater sophistication, by using a system identification method to determine a "black box" model that, on receiving as input the signal SM corresponding to the waves sailed through during the training period, generates as output a correction signal SC' that would cause the same effect on the rudder G as the effect caused by said manual corrections made by the helmsperson. This is a technique that is well known in automatic control. In this way, after the training stage, the system can operate correctly without requiring human intervention despite variations in the period, in the height, and in the direction of the waves, provided that such variations are not too large.

It is also possible to combine the two approaches: e.g. the identification can relate only to the amplitude and length of time of the correction, while mean values are used for its timing, or vice versa.

Alternatively, it is possible to use a correction of fixed amplitude and of fixed length of time, and whose timing depends on the period of the waves, as measured continuously by means of the movement detector device DM. This method also enables the system to operate correctly without requiring human intervention in spite of the variations in the period and/or in the direction of the waves, provided that said variations are not too large.

Optionally, the correction module MC can have an inlet EAM for a manual adjustment signal SAM for manually adjusting the correction signal SC, in a manner such as to enable a human operator to intervene, even after the calibration stage, for the purpose of manually adjusting the amplitude, the length of time, and/or the timing of said correction signal SC.

The embodiment shown in FIG. 2 is particularly advantageous because it makes it possible to add the correction module of the invention to a conventional automatic pilot system while making only marginal modifications to that system (inserting the adder device S between the main pilot module MPP and the actuator module MA). However, it is to be understood that the invention also covers an embodiment in which the features of the modules MPP and MCC are integrated in a common unit.

The invention claimed is:

1. An automatic pilot system for automatically steering a sailboat, which system comprises:
   a main pilot module (MPP) for generating a main steering signal (SPP) in order to keep the sailboat on a predetermined heading;
   a movement detector device (DM) for detecting movement of the sailboat that is caused by waves, and for generating a signal (SM) indicating said movement;
   a steering correction signal generator module (MC) for generating steering correction signals and comprising an inlet (EM) for said signal (SM) indicating movement of the sailboat that is caused by waves, a processing unit (UE) for generating a steering correction signal (SC) on the basis of said signal (SM) indicating movement of the sailboat, and an outlet (SSC) for said steering correction signal (SC); and
   an actuator module (MA) for actuating a rudder (G) of said sailboat on the basis at least of said main steering signal (SPP) and of said steering correction signal (SCP);
   said system being characterized in that said steering correction signal (SC) is determined in a manner such as to cause a course of the sailboat to be corrected towards the direction from which the waves are coming in correspondence with their crests (CI, CII) and away from said direction in correspondence with their troughs (CR).

2. A system according to claim 1, in which the processing unit (UE) of the steering correction signal generator module (MC) is designed to generate, in correspondence with the sailboat going over a wave (W), a steering correction signal (SC) determined on the basis of a portion of said signal (SM) indicating movement of the sailboat that is caused by the same wave (W).

3. A system according to claim 1, in which the steering correction signal generator (MC) further comprises:
- an inlet (EA) for a training signal (SA) representative of a steering correction made manually by a human operator during a calibration stage; and
- in which the processing unit (UE) of said steering correction signal generator module (MC) includes training means for determining, on the basis of said training signal (SA), a relationship between said signal (SM) indicating movement of the sailboat and the corresponding steering correction signal (SC).

4. A system according to claim 3, in which at least one parameter from among the amplitude, the length of time, and the timing of said steering correction signal (SC) is determined on the basis of a mean value of a parameter of said training signal (SA).

5. A system according to claim 3, in which said relationship between said signal (SM) indicating movement of the sailboat and the corresponding steering correction signal (SC) is determined, at least in part, by a system identification algorithm.

6. A system according to claim 1, in which the steering correction signal generator module (MC) further comprises an inlet (EAM) for a manual adjustment signal (SAM) for manually adjusting said steering correction signal (SC).

7. A system according to claim 1, in which said movement detector device (DM) for detecting movement of the sailboat includes at least one accelerometer for determining acceleration of a portion of the sailboat.

8. A system according to claim 1, in which said movement detector device (DM) for detecting movement of the sailboat includes at least one satellite positioning device for determining the instantaneous position of a portion of the sailboat.

* * * * *